US010144851B2

(12) United States Patent
McArdle et al.

(10) Patent No.: US 10,144,851 B2
(45) Date of Patent: Dec. 4, 2018

(54) CYANOACRYLATE COMPOSITION

(71) Applicant: AFINITICA TECHNOLOGIES, S. L., Cerdanyola del Vallès (ES)

(72) Inventors: Ciaran McArdle, Cerdanyola del Vallès (ES); Arnau Pejoan Jiménez, Cerdanyola del Vallès (ES); Juan Andrés López Maeso, Cerdanyola del Vallès (ES); Stefano Gherardi, Cerdanyola del Vallès (ES)

(73) Assignee: AFINITICA TECHNOLOGIES, S. L., Cerdanyola del Vallès (ES)

( * ) Notice: Subject to any disclaimer, the term of this patent is extended or adjusted under 35 U.S.C. 154(b) by 486 days.

(21) Appl. No.: 15/027,302

(22) PCT Filed: Oct. 22, 2014

(86) PCT No.: PCT/IB2014/065530
§ 371 (c)(1),
(2) Date: Apr. 5, 2016

(87) PCT Pub. No.: WO2015/059644
PCT Pub. Date: Apr. 30, 2015

(65) Prior Publication Data
US 2016/0251548 A1    Sep. 1, 2016

(30) Foreign Application Priority Data

Oct. 24, 2013 (ES) .................. 201331566

(51) Int. Cl.
*B29C 73/00* (2006.01)
*B32B 43/00* (2006.01)
(Continued)

(52) U.S. Cl.
CPC ................ *C09J 4/00* (2013.01); *B32B 43/00* (2013.01); *C04B 28/188* (2013.01);
(Continued)

(58) Field of Classification Search
CPC ..... C09J 4/00; C09J 11/00; C09J 11/02; C09J 11/04; C08F 222/32; C08L 35/04;
(Continued)

(56) References Cited

U.S. PATENT DOCUMENTS 3,540,126 A * 11/1970 Banitt ................... C07C 43/137
433/217.1
3,607,542 A    9/1971 Leonard et al.
(Continued)

FOREIGN PATENT DOCUMENTS

DE    2128939 A1    12/1971
ES    556348 A1    6/1985
(Continued)

OTHER PUBLICATIONS

International Search Report dated Jan. 21, 2015 from corresponding International Application No. PCT/IB2014/065530; 3 pgs.

*Primary Examiner* — Philip C Tucker
*Assistant Examiner* — Brian R Slawski
(74) *Attorney, Agent, or Firm* — Maier & Maier, PLLC

(57) ABSTRACT

The present invention relates to a cyanoacrylate composition having a heterogeneous curing initiator which is a hydrated calcium silicate. The composition is suitable for repairing and filling depressions, cracks, or holes in a substrate or between substrates to be bonded. It also relates to an adhesive comprising said composition, to a syringe containing it, to a method for bonding substrates, to the use of said composition, and to the use of said hydrated calcium silicate as curing agent for cyanoacrylate compositions.

14 Claims, 1 Drawing Sheet

(51) Int. Cl.
| | |
|---|---|
| C09J 4/00 | (2006.01) |
| C09J 101/00 | (2006.01) |
| C09J 201/00 | (2006.01) |
| B29C 65/00 | (2006.01) |
| B32B 37/00 | (2006.01) |
| C08F 8/30 | (2006.01) |
| C08L 39/00 | (2006.01) |
| B05D 3/00 | (2006.01) |
| B32B 3/26 | (2006.01) |
| C08F 265/08 | (2006.01) |
| C08F 267/08 | (2006.01) |
| C08F 20/00 | (2006.01) |
| C08F 22/30 | (2006.01) |
| C08F 22/36 | (2006.01) |
| C08F 120/00 | (2006.01) |
| C08F 122/30 | (2006.01) |
| C08F 122/36 | (2006.01) |
| C04B 28/18 | (2006.01) |
| C08F 122/32 | (2006.01) |
| C09J 5/00 | (2006.01) |
| C09J 11/04 | (2006.01) |
| B32B 37/12 | (2006.01) |
| B29C 65/48 | (2006.01) |
| B29C 73/02 | (2006.01) |
| C08F 222/32 | (2006.01) |
| C08K 3/34 | (2006.01) |
| C04B 103/00 | (2006.01) |
| C04B 103/10 | (2006.01) |
| C04B 103/44 | (2006.01) |
| C04B 111/00 | (2006.01) |

(52) U.S. Cl.
CPC ............... *C08F 122/32* (2013.01); *C09J 5/00* (2013.01); *B29C 65/484* (2013.01); *B29C 73/02* (2013.01); *B32B 2037/1261* (2013.01); *C04B 2103/0046* (2013.01); *C04B 2103/0085* (2013.01); *C04B 2103/10* (2013.01); *C04B 2103/44* (2013.01); *C04B 2111/00663* (2013.01); *C08F 222/32* (2013.01); *C08K 3/34* (2013.01); *C09J 11/04* (2013.01); *C09J 2433/00* (2013.01)

(58) Field of Classification Search
CPC ....... B32B 43/00; B32B 27/04; B32B 27/308; B32B 2037/1261; B29C 73/02; B29C 65/484
USPC ..... 156/60, 94, 325, 326, 327, 330.9, 331.1, 156/331.2, 331.6, 331.8; 523/118; 524/555, 556; 427/140; 428/63; 525/295; 526/298
See application file for complete search history.

(56) References Cited

U.S. PATENT DOCUMENTS

| | | | | |
|---|---|---|---|---|
| 3,839,065 | A | * 10/1974 | Overhults | A61C 5/00 106/481 |
| 4,042,442 | A | 8/1977 | Dombroski | |
| 4,526,636 | A | 7/1985 | Mader | |
| 6,642,337 | B1 | * 11/2003 | Misiak | C08K 5/46 524/555 |
| 8,287,687 | B1 | 10/2012 | Schueneman et al. | |
| 2002/0119184 | A1 | * 8/2002 | Nicholson | A61L 24/06 424/448 |
| 2004/0242803 | A1 | * 12/2004 | Ohme | C08L 59/00 525/400 |
| 2005/0000646 | A1 | * 1/2005 | Ryan | C08K 5/34 156/314 |
| 2006/0241226 | A1 | 10/2006 | Bachon et al. | |
| 2007/0078207 | A1 | 4/2007 | Jonn et al. | |
| 2012/0189793 | A1 | * 7/2012 | Tsuneizumi | C08K 5/435 428/35.7 |
| 2012/0247497 | A1 | 10/2012 | Zhang et al. | |
| 2012/0289655 | A1 | * 11/2012 | Sumita | B29C 45/0001 525/67 |
| 2012/0296017 | A1 | * 11/2012 | Tsuboi | C08J 3/201 524/94 |
| 2013/0131227 | A1 | * 5/2013 | Odagiri | C08K 5/053 524/58 |
| 2013/0203932 | A1 | * 8/2013 | Fujisawa | C08L 25/06 524/577 |
| 2013/0281619 | A1 | * 10/2013 | Uehira | C08G 63/199 524/604 |
| 2014/0303296 | A1 | * 10/2014 | Inazawa | C08L 27/18 524/127 |
| 2015/0051324 | A1 | * 2/2015 | Nonokawa | C08K 5/053 524/89 |

FOREIGN PATENT DOCUMENTS

| | | |
|---|---|---|
| GB | 2386121 A | 9/2003 |
| WO | 20040061030 A1 | 7/2004 |
| WO | 20070072466 A1 | 6/2007 |
| WO | 20080112087 A1 | 9/2008 |

* cited by examiner

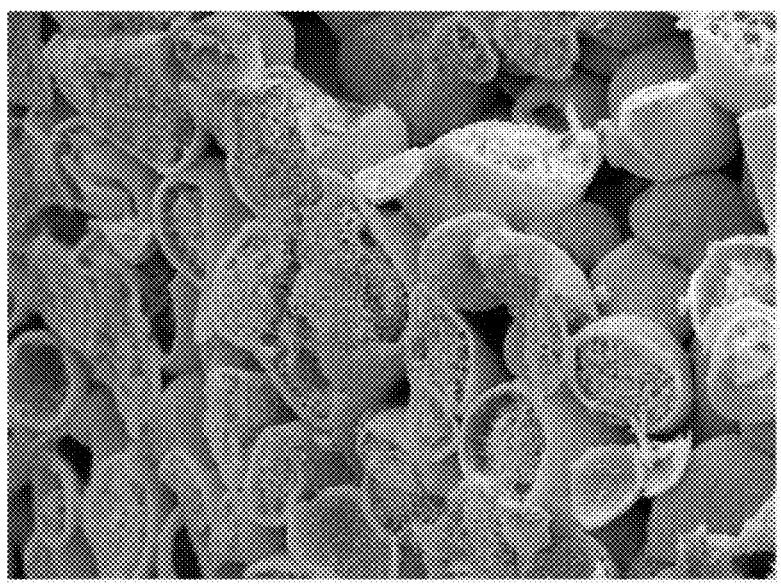

CYANOACRYLATE COMPOSITION

TECHNICAL FIELD

The present invention refers to a cyanoacrylate adhesive composition comprising a heterogeneous cure initiator and that is suitable for its use for filling depressions, cracks or holes in a substrate or between two substrates to be bonded.

TECHNICAL BACKGROUND

Cyanoacrylate is the generic name for a family of fast acting resistant adhesives based on esters of the 2-cyanoacrylic acid. The structure of the monomer is as follows:

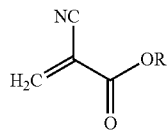

wherein R is generally an alkyl group as, for example, methyl, ethyl, butyl, or octyl.

Such compounds have been well known for some time, as described in, for example, S. Ebnesajjad Ed., *Adhesives Technology Handbook*, William Andrew, Norwich, 2008.

Cyanoacrylate is a reactive adhesive whose curing takes place by a polyaddition mechanism once the double bond of the monomer is opened. It is a chain reaction and has a high reaction speed, unlike polycondensations which are slow reactions. The polyaddition mechanism for cyanoacrylates is of an ionic nature, and is especially fast, proceeding faster than other polyaddition reactions based on radical mechanisms. Therefore, in the case of the cyanoacrylate adhesives the amount of time that elapses between the application and the resistance to handling is very short in comparison with that of the epoxy or polyurethane type adhesives, for example, that polymerize by polycondensation reactions.

In many industrial and domestic applications it is used in the form of one-component, which polymerizes rapidly when is in form of a thin film between two substrates, in the presence of anions or nucleophilic species such as, for example, the hydroxide ions from water, hydroxyl groups on the surface of the substrates, basic oxides, etc. The speed at which the bond is formed and the ease of use have contributed to its popularity.

In other more technical applications it is used in the form of two components: one of them contains the cyanoacrylate and the other contains the initiator or curing agent.

Some of the limitations of cyanoacrylates are, for example, the low filling capacity of gaps existing between the two substrates to be bonded. This aspect has significantly reduced the application field of such adhesives.

In the prior art different approaches have been described to address this problem, but results have not been entirely satisfactory. The technical solutions, which have been described, consist of combining the cyanoacrylate composition with a separate particulate filler at the point of application to fill the hole.

Thus, in the U.S. Pat. No. 4,526,636 a laborious method is described for repairing the cracks formed, for example, in plastic laminate elements that comprises the steps of: coating the edges of the crack with a cyanoacrylate liquid adhesive; immediately afterwards and before the coating is dry, fill the crack with a particulate material; soak the material with the liquid cyanoacrylate adhesive and allow the adhesive to cure.

A similar method is described in the international patent application WO-A-2007/072466. According to this document the filler material is applied first in the space to be filled, at least partially filling it, and then the cyanoacrylate is applied to this material and it is allowed to cure at room temperature.

Also in the Spanish patent ES556348 a composition is described suitable for sealing punctures and ruptures in various materials. According to the described method, a layer of cyanoacrylate adhesive is applied on the rupture or opening to be sealed, and on top of this adhesive layer it is spread a layer of a powdered solid containing hydroxyl groups and/or carboxylate.

Another approach that is found in the prior art consists in incorporating a filler into the cyanoacrylate composition.

Thus, in the British patent application GB-A-2386121 an adhesive cement is described comprising a cyanoacrylate and an aluminosilicate glass-ionomer treated with an acid polymerization inhibitor for its application in dental restorations.

In the U.S. patent application US-A-2006/0241226 an adhesive is described comprising at least 50% of a cyanoacrylate and between 5% and 15% of a halogenated polymer, for example PVC, with a Fikentscher K value of at least 46. This K value is related to the intrinsic viscosity of the polymer. According to this document, the incorporation of the halogenated polymer contributes to significantly augment the filling properties of the cyanoacrylate.

In the U.S. Pat. No. 8,287,687 a system is described to produce a composite from a cyanoacrylate composition and a poly-paraphenylene terephthalamide organic micropulp in a curable (meth)acrylate matrix.

In the international patent application WO-A-2008/112087 a cyanoacrylate adhesive composition is described comprising graphite pellets as filler.

In the German patent application DE-A-2128939 an adhesive cyanoacrylate cement is described comprising finely divided sodium fluoride and alumina, which is suitable for the restoration of teeth.

In the international patent application WO-A-2004/061030 an adhesive composition is described comprising cyanoacrylate, a toughening agent that comprises poly(vinylidene chloride-co-acrylonitrile) in combination with silica.

Despite the many contributions described in the state of the art, none of them provides a satisfactory solution to the problem of filling depressions, cracks, holes, by the use of cyanoacrylates.

Thus, there remains the need of providing a curable adhesive composition that allows a rapid curing in volume, can be applied in any direction, does not present a significant shrinkage, and is of easy application.

Objet of the Invention

The object of the present invention is a cyanoacrylate composition.

Also part of the object of the invention is an adhesive comprising the cyanoacrylate composition.

Also part of the object of the invention is a syringe comprising the cyanoacrylate composition.

Also part of the object of the invention is a repairing method.

Also part of the object of the invention is the use of hydrated calcium silicate that has the chemical structure of xonotlite, whose particles are substantially spherical and microporous, as a curing agent.

Also part of the object of the invention the use of the cyanoacrylate composition.

BRIEF DESCRIPTION OF THE FIGURES

FIG. 1

FIG. 1 shows a photograph obtained by means of the scanning electron microscope of the hydrated calcium silicate (Promaxon® D) which can be found on the website www.labinusfibres.com. In this photograph one can observe the substantially spherical shape of the particles of this silicate, as well as their characteristic microporosity.

DETAILED DESCRIPTION OF THE INVENTION

The object of the present invention is a cyanoacrylate composition comprising:
1) a component A comprising a cyanoacrylate, and
2) a component B comprising a hydrated calcium silicate that has the chemical structure of xonotlite, whose particles are substantially spherical and microporous.

The authors of the present invention have developed a cyanoacrylate adhesive composition which allows the preparation of an adhesive that has a suitable usage time, both for domestic and industrial applications, is fast to cure in volume, can be applied in any direction, does not present a significant shrinkage, and is easy to apply. Furthermore, the developed compositions generate a high tensile resistance when on bonds made from a wide variety of substrates, even if the substrates are separated by a gap of 2 mm or more. When this composition is cured in a volume for filling holes, the cured material is physically resistant and can be sanded with glass paper to achieve a smooth finish.

In the present description as well as in the claims, the singular forms "a," "an" and "the" include the reference in plural unless the context clearly indicates otherwise.

In this description, the percentages (%) are expressed in weight/weight unless it is indicated otherwise.

Component A

The component A of the composition of the invention comprises a cyanoacrylate.

In the context of the invention the term cyanoacrylate comprises cyanoacrylate monomers that can be represented by the general formula (I):

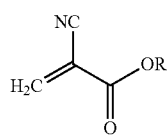

wherein R is selected from the group consisting of $C_1$-$C_{16}$ alkyl groups, $C_2$-$C_{16}$ alkoxyalkyl, $C_3$-$C_{16}$ cycloalkyl, $C_2$-$C_{16}$ alkenyl, $C_7$-$C_{16}$ aralkyl, $C_6$-$C_{16}$ aryl, $C_3$-$C_{16}$ allyl, and $C_1$-$C_{16}$ haloalkyl. Preferably R is methyl, ethyl, n-propyl, i-propyl, n-butyl, sec-butyl, n-pentyl, n-hexyl, n-octyl, 2-ethylhexyl, allyl, β-methoxyethyl, or combinations thereof; more preferably R is ethyl, $C_2$-$C_{16}$ alkoxyalkyl, 2-ethylhexyl, or combinations thereof; and still more preferably is ethyl.

Such monomers can be prepared by methods known by the skilled in the art as, for example, the method described in the U.S. Pat. No. 2,467,927. Some of them, such as ethyl and 2-methoxyethyl cyanoacrylate are commercially available through, for example, the company Henkel.

In the component A of the composition of the invention, the content of cyanoacrylate is generally comprised between 50% by weight and 99% by weight, preferably between 60% and 98%, and more preferably between 85% and 90%.

Preferably component A comprises a stabilizing agent selected from the group consisting of radical stabilizing agents, acid stabilizing agents, and mixtures thereof.

Radical stabilizing agents are radical polymerization inhibitors, and are preferably selected from the group consisting of 4-methoxyphenol, hydroquinone, hydroquinone monomethyl ether, hydroxytoluene butyl ether, hydroxyanisole butyl ether, and mixtures thereof.

In the component A of the composition of the invention, the content of the radical stabilizing agent is generally comprised between 0.001% by weight and 0.2% by weight, preferably between 0.01% and 0.1%, and more preferably between 0.02% and 0.06%.

The acid stabilizing agents are inhibitors of the anionic polymerization, and are selected from the group consisting of Bronsted acids, Lewis acids, and mixtures thereof. The acid stabilizing agents are preferably selected from the group consisting of methanesulfonic acid, p-toluenesulfonic acid, hydrofluoric acid, boron trifluoride, boron trifluoride etherate complex, sulfur dioxide, sulfur trioxide, tin (IV) chloride, iron (III) chloride, citric acid, and mixtures thereof, more preferably from methanesulfonic acid, hydrofluoric acid, boron trifluoride, boron trifluoride etherate complex, sulfur dioxide, and mixtures thereof.

In the component A of the composition of the invention, the content of the acid stabilizing agent is generally comprised between 0.0003% by weight and 0.1% by weight, preferably between 0.001% and 0.05%, and more preferably between 0.0015% and 0.02%.

Generally the composition includes an acid stabilizing agent in gas phase, such as sulfur dioxide or boron trifluoride, already mentioned. Its presence in the empty space of the containers prevents cyanoacrylate polymerization.

In an especially preferred embodiment of the component A, the stabilizing agent is a combination of methanesulfonic acid, sulfur dioxide and 4-methoxyphenol, being more preferred the combination of between 0.014% and 0.018%, more preferably 0.016% by weight of methanesulfonic acid, between 0.0005% and 0.0015%, more preferably 0.001% by weight of sulfur dioxide, and between 0.02% and 0.06%, more preferably 0.04% by weight of 4-methoxyphenol.

The component A can also contain thickeners, thixotropic agents, accelerators, antioxidants, pigments, colorants, aromatic carboxylic acids or anhydrides, or an α-substituted acrylic acid, optionally in anhydride form.

In a preferred embodiment component A further comprises a thickener, and a thixotropic agent.

In another preferred embodiment component A further comprises a thickener, a thixotropic agent, an accelerator, and an antioxidant.

In a particularly preferred embodiment component A comprises cyanoacrylate, a radical stabilizing agent, an acid stabilizing agent, a thickener, a thixotropic agent, an accelerator, and an antioxidant, that optionally also comprises an aromatic carboxylic acid or anhydride or an α-substituted acrylic acid, optionally in anhydride form.

A suitable thickener for component A can be, for example, polymethylmethacrylate (for example Degacryl® M 449, Evonik), copolymers of vinyl acetate and vinyl alcohol (for example Levamelt® 900, Lanxess), copolymers of vinyl chloride and vinyl acetate (for example, Vinnol® H 40-60, Wacker), copolymers of ethylene, vinyl acetate, and esters or partial esters of maleic acid (for example, Vamac® G, DuPont), and mixtures thereof.

Typically the content of thickener in the component A is comprised between 2% and 10% by weight, preferably between 4% and 8%, and more preferably between 5.5% and 7.5%.

A suitable thixotropic agent for component A can be hydrophobized silica (for example, Aerosil® R202, Evonik). Typically the content of the thixotropic agent in component A is comprised between 2% and 10% by weight, preferably between 4% and 8%, and more preferably between 5.5% and 7.5%.

A suitable accelerator for component A can be a crown ether (for example, 18 Crown 6, Alfa Aesar Co). Typically the content of the accelerator in component A is comprised between 0.01% and 0.8% by weight, preferably between 0.05% and 0.5%, and more preferably between 0.1% and 0.3%.

A suitable antioxidant for component A can be methylenebis(4-methyl-6-t-butylphenol) as well as hydroxyanisole butyl ether, 4-methyl-2,6-di-t-butylphenol, methylhydroquinone, t-butylhydroquinone, among others. Typically the content of antioxidant in component A is comprised between 0.01% and 0.8% by weight, preferably between 0.05% and 0.5%, and more preferably between 0.1% and 0.3%.

The pigment that occasionally comprises component A can confer coloration to the composition so that the repair made becomes less visible. Typically the content of pigment in component A is comprised between 2% and 5% by weight.

An aromatic carboxylic acid or anhydride or an α-substituted acrylic acid, optionally in anhydride form, can be included in component A to improve the adhesion to metal substrates. Among them can be mentioned the trimellitic acid, trimellitic anhydride, pyromellitic acid, pyromellitic anhydride, dianhydride of 3,3',4,4'-benzophenonetetracarboxylic acid, itaconic acid, itaconic anhydride, 3-buten-1,2,3-tricarboxylic acid. Typically the content of aromatic carboxylic acid in component A is comprised between 0.04% and 0.1% by weight.

A particularly preferred component A comprises between 85% and 90% by weight of $C_1$-$C_{16}$ alkyl cyanoacrylate, preferably ethyl cyanoacrylate; between 5.5% and 7.5% by weight of a thickener, preferably methyl polymethacrylate; between 5% and 7.5% by weight of a thixotropic agent, preferably hydrophobized silica; between 0.1% and 0.3% by weight of an accelerator, preferably a crown ether; between 0.1% and 0.3% by weight of an antioxidant, preferably methylenebis(4-methyl-6-t-butylphenol); between 0.02% and 0.06% by weight of a radical stabilizing agent, preferably 4-methoxyphenol; between 0.0015% and 0.02% by weight of an acid stabilizing agent, preferably a combination of methanesulfonic acid and sulfur dioxide.

The percentages refer to the percentage by weight of a particular ingredient based on the total weight of the component A. The sum of the percentages of the different ingredients of component A is 100%.

Component B

The component B of the composition of the invention comprises a hydrated calcium silicate having the chemical structure of xonotlite, whose particles are substantially spherical and microporous.

This hydrated calcium silicate has the function of heterogeneous initiator of the cure of the cyanoacrylate that is in the component A, when it comes into contact with the component B to form the adhesive.

This silicate has the chemical formula of xonotlite $Ca_6Si_6O_{17}(OH)_2$ and substantially spherical and microporous particles. This product has an apparent density comprised between 85 g/l and 130 g/l, the mean particle size is comprised between 35 microns and 65 microns, and it has the CAS registry number 1344-95-2. This product is available commercially as Promaxon® D through the company Lapinus Fibers (Belgium). The substantially spherical shape of the silicate particles and their characteristic microporosity can be easily observed through the photographs obtained by the scanning electron microscope (FIG. 1).

Surprisingly it has been found that the inclusion of this silicate in a cyanoacrylate composition allows the application of the adhesive in any direction, a curing in volume with no significant shrinkage, which is appropriate to be used in repairs, for the filling of depressions, cracks or holes in substrates or between substrates with a very convenient usage time and fixture time, for both domestic and industrial use.

Thus, it is part of the object of the invention the use of hydrated calcium silicate having the chemical structure of xonotlite, whose particles are substantially spherical and microporous as curing agent of a cyanoacrylate composition.

In component B, the content of the hydrated calcium silicate is generally comprised between 0.5% and 8% by weight, preferably between 1% and 6%, and more preferably between 1.5% and the 4%.

Typically the component B preferably comprises a thixotropic agent. A suitable thixotropic agent for component B can be hydrophobized silica (for example, Aerosil® R202, Evonik). Typically the content of thixotropic agent in component B is comprised between 0.5% and 8% by weight, preferably between 1% and 5%, and more preferably between 2% and 4%.

Component B can also comprise a pigment. The pigment that occasionally comprises component B allows conferring coloration to the composition so that the repair made becomes less visible. Typically the pigment content in component B is comprised between 2% and 5% by weight.

Preferably component B comprises hydrated calcium silicate and a thixotropic agent.

Component B typically comprises a diluent, which can behave at the same time as a plasticizer. The diluent can be polymerizable or non-polymerizable. Among the polymerizable diluents can be mentioned, for example, acrylic oligomers, or alkyd resins. Among the non-polymerizable diluents can be mentioned phthalates, azelates, adipates, alkyl sebacates, among others. A suitable diluent for component B is triacetin (Alfa Aesar Co). Preferably, triacetin is used as a diluent. Generally the content of diluent in component B is comprised between 90% and 99% by weight, preferably between 92% and 98%.

In a preferred embodiment, component B comprises an organic base defined by the general formula (II):

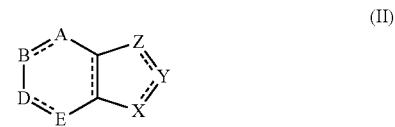

(II)

wherein:

X=NH, CH$_2$, CH$_2$CH$_2$, N,

Y=NH, CH$_2$, CH$_2$CH$_2$, CHCH$_3$, methine (=CH), chloromethine (=CCl), C=O,

Z=CH$_2$, CH—CH$_3$, C(CH$_3$)$_2$, CHCO$_2$H, methine (=CH), NH, NCH$_3$, N

A=CH, C=O, CCF$_3$, COH, CNO$_2$, C-halogen,

B=CH, CCO$_2$H, CSO$_3$H, NH, NCH$_3$, NCH$_2$CH(OH)CH$_2$OH, NCH$_2$CH(OH)CH$_2$N(CH$_3$)CH$_2$CH$_2$OH, N(CH$_2$)$_4$COCH$_3$, CCF$_3$, COH, CNO2, CCO$_2$H, C-halogen, D=CH, C=O, CCF$_3$, COH, CNO$_2$, CCO$_2$H, C-halogen, E=CH, NH, NCH$_3$, NCH$_2$CH(CH$_3$)$_2$, CCF$_3$, COH, CNO$_2$, CCO$_2$H, C-halogen, and wherein the dashed lines in the formula (II) indicate that any bond may be single or double.

Examples of organic base of formula (II) are the following:

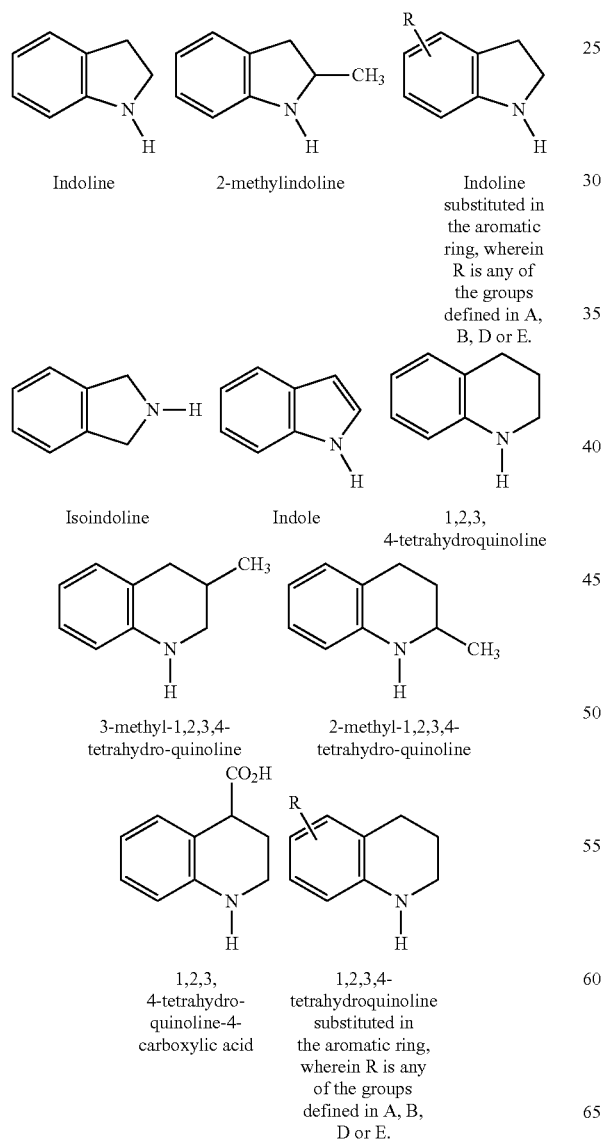

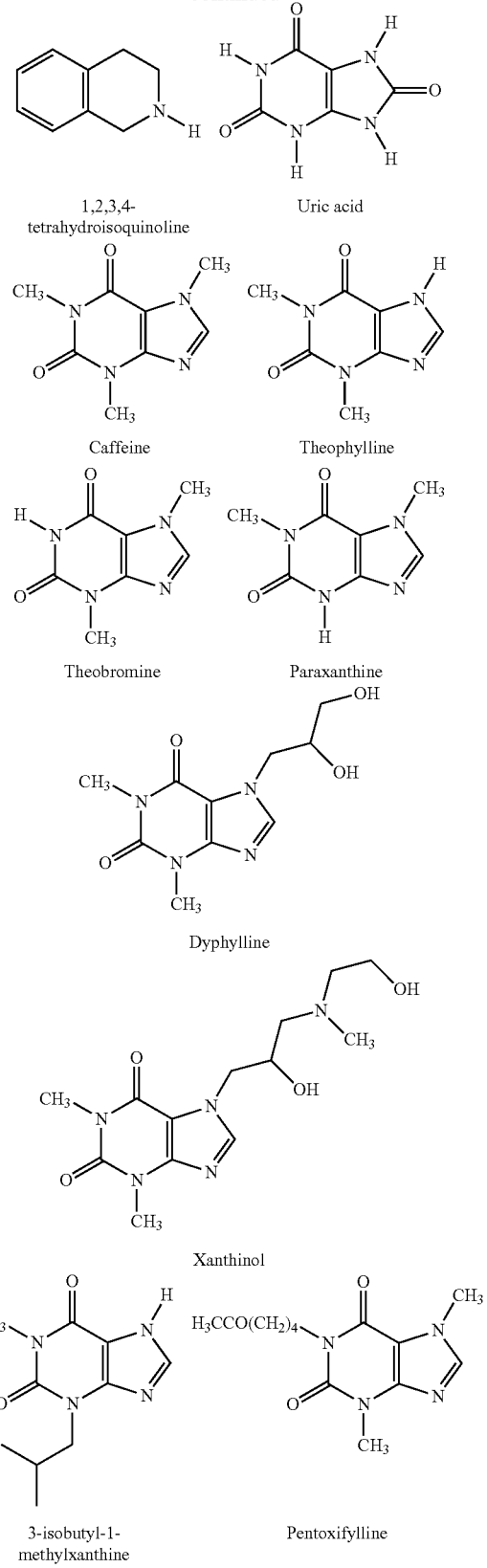

Preferably the organic base is selected from the group formed by caffeine and indoline, and more preferably is caffeine.

The organic base acts as an anionic initiator of the curing of the cyanoacrylate which is in the component A of the composition of the invention.

In component B, the content of the organic base of formula (II) is generally comprised between 0.05% and 1% by weight, more preferably between 0.1% and 0.8%, and still more preferably between 0.2% and 0.6%.

A preferred embodiment of component B comprises between 92% and 98% by weight of diluent, preferably triacetin; between 1.5% and 4% by weight of hydrated calcium silicate that has the chemical structure of xonotlite, whose particles are substantially spherical and microporous. In a more preferred embodiment, component B further comprises between 0.2% and 0.6% of an organic base of formula (II), preferably caffeine.

The percentages refer to the percentage by weight of a particular ingredient based on the total weight of the component B. The sum of the percentages of the different ingredients of component B is 100%.

A particularly preferred cyanoacrylate composition comprises a component A that comprises between 85% and 90% by weight of $C_1$-$C_{16}$ alkyl cyanoacrylate, preferably ethyl cyanoacrylate; between 5.5% and 7.5% by weight of a thickener, preferably methyl polymethacrylate; between 5% and 7.5% by weight of a thixotropic agent, preferably hydrophobized silica; between 0.1% and 0.3% by weight of an accelerator, preferably a crown ether; between 0.1% and 0.3% by weight of an antioxidant, preferably methylenebis (4-methyl-6-t-butylphenol); between 0.02% and 0.06% by weight of a radical stabilizing agent, preferably 4-methoxyphenol; between 0.0015% and 0.02% by weight of an acid stabilizing agent, preferably a combination of methanesulfonic acid and sulfur dioxide; and a component B comprising between 92% and 98% by weight of diluent, preferably triacetin; between 1.5% and 4% by weight of hydrated calcium silicate having the chemical structure of xonotlite, whose particles are substantially spherical and microporous. In a more preferred embodiment, component B further comprises between 0.2% and 0.6% of an organic base of formula (II), preferably caffeine.

Adhesive and Repair Method

It is part of the object of the invention an adhesive that comprises the cyanoacrylate composition of the invention.

This adhesive is composed of approximately 4 parts of component A and approximately 1 part of component B, which are intimately mixed before proceeding to the use of the adhesive.

It is also part of the invention a syringe comprising the cyanoacrylate composition of the invention.

Preferably the syringe is a syringe with two chambers each of different volume, one for component A and another one for component B. The component A is placed in the chamber of larger volume, because the adhesive is obtained by mixing in volume 4 parts of component A and 1 part of component B. The preparation of the adhesive is made by the mixture of component A with component B by manual pressure on the plunger of the syringe, which forces the content of the chambers, the components A and B, to enter into the static mixer and, thus, at its outlet the adhesive of the invention is obtained. In the adhesive, the two components A and B are intimately mixed.

It is also part of the object of the invention a repair method for filling depressions, cracks or holes in a substrate or between substrates comprising:

1) combining 4 parts by volume of component A of the composition of the invention and 1 part by volume of component B of the composition of the invention, 2) applying this mixture into a depression, crack or hole of a substrate or on the upper part of a substrate, and optionally 3) assembling a second substrate atop the first substrate.

It is also part of the object of the invention the use of the adhesive of the invention for repairing and for filling depressions, cracks or holes in a substrate or between substrates. The composition is suitable for various types of substrates such as, for example, metal (aluminum, steel, . . . ), glass, ceramics, plastics (PVC, ABS, polycarbonate, methyl polymethacrylate, . . . ), stone, rubber, leather, textiles, wood, keratinous substrates (hooves of cattle), etc. In particular the composition of the invention is suitable for making repairs in the car, household objects, such as glasses, ceramic objects, for do-it-yourself activities. It also finds application when one substrate is a hoof of cattle and the other a wood block, such as those used to protect damaged hooves.

Application Tests

To test the cyanoacrylate composition of the invention, component A and component B can be packed independently in the two chambers of a double-plunger syringe that allows the intimate mixture through a static mixer of 4 parts by volume of component A and 1 part by volume of component B and thereby an adhesive is obtained.

This adhesive is dispensed onto a part of the substrate to be bonded, covering a specific area, and the second part of the substrate is assembled atop the first. The two assembled parts can be clamped with clips to keep their relative position, and are maintained generally at room temperature for a period of time of approximately 24 hours. After this period, the tensile strength of the assembled pieces can be determined by destructive tests.

For each composition, the following parameters can be evaluated:

Tensile strength, expressed in MPa.

Fixture Time (FT), expressed in minutes, to be counted after assembling the sample of two substrates with the adhesive mixture, and measuring the elapsed time for the bonded sample to be able to hold a weight of 3 kg for 30 seconds without breaking away.

Working time (WT), expressed in minutes, is recorded after assessing the dispensability of the adhesive composition as a function of time held within the static mixer. WT parameter represents the time in which the adhesive composition may be dispensed with ease through the outlet of the static mixer and it still exhibits a relatively short fixture time (FT) (for example, less than 60 seconds) in bonding tests.

Usage time (UT), expressed in minutes, is determined after visual examination when testing the adhesive composition with a spatula and determine if it was cured or not, as well as after subsequently testing the assembly of parts and measuring FT as a function of the period of time during which the adhesive stands on the part.

Cure through volume (CTV) is determined by tensile testing. Bondline thickness or gap is pre-set by means of a stainless steel wire (diameter of 1 or 2 mm) shaped into a U and placed onto one of the substrates within the overlap area of the bond to be formed. Then, the adhesive composition is dispensed to fill the volume set by the wire and the overlap area. The complete filling is ensured by assembling the substrates and removing the excess adhesive that is squeezed out of the joint after clamping both sides of the substrate with clips. The bonded substrates are kept 24 hours at room temperature. Tensile test data under these conditions are compared to the tensile test data performed on samples that do not include the steel wire.

Observation of shrinkage after curing of adhesive compositions can be assessed subjectively. To this end, uniform cylinders with a volume of approximately 273 mm$^3$ can be prepared by drilling a blind hole of 8 mm of diameter and a depth of 5 mm. The mixed adhesive composition is carefully dispensed to fill the empty volume, and the samples are allowed to cure completely at room temperature. Inspection of the open-end of the cylinder for each adhesive composition allows determining whether there is evident shrinkage or not.

It is observed that the adhesive compositions of the invention show usage times (UT) comprised between 2 and 4 minutes, and working times comprised between 3 and 7 minutes, which are appropriate for fast repair works both in the domestic and industrial environment.

No significant shrinkage was observed, even when cured with low filler content.

The energy parameter is the amount of energy absorbed during the destructive test, and is representative of the resistance of the cured material towards tension.

It is also observed that the absorbed energy is higher in the case of using an organic base combined with the hydrated calcium silicate, even when the content of it is low.

The cured compositions corresponding to the compositions of the invention were able to be treated with an abrasive, such as glass paper or metal file to obtain smooth surfaces.

The high values of CTV obtained in compositions that did not contain an additional curing agent, reveal that, surprisingly, the hydrated calcium silicate is by itself a curing agent effective in volume.

Next, several examples are provided by way of illustration but not are limitative of the invention.

EXAMPLES

Example 1: Preparation of Component a

A component A was prepared with the components listed in Table I:

TABLE I

| Component | Function | % by weight |
|---|---|---|
| Ethyl cyanoacrylate | Polymerizable monomer | 87.563 |
| Methyl polymethacrylate (Degacryl ® M-449, Evonik) | Thickener | 5.98 |
| Hydrophobized silica (Aerosil ® R 202, Evonik) | Thixotropic agent | 5.98 |
| Crown ether 18-6 (18 Crown 6, Alfa Aesar Co.) | Accelerator | 0.2 |
| Methylene-bis-(4-methyl-6-t-butylphenol) | Antioxidant | 0.22 |
| 4-methoxyphenol | Radical stabilizer | 0.04 |
| Methanesulfonic acid | Stabilizer | 0.016 |
| Sulfur dioxide | Stabilizer | 0.001 |

Ethyl cyanoacrylate was directly mixed with the stabilizing agents, the antioxidant agent and the accelerating agent, and was heated to approximately 60° C. in a high-density polyethylene container. The thickening agent was added slowly under mechanical stirring. Subsequently, the mixture was cooled to room temperature and the hydrophobized silica was gradually added with high shear mechanical stirring. The composition was stirred at room temperature for approximately 90 minutes, and was transferred to a capped high-density polyethylene container.

This component was used to prepare the cyanoacrylate composition of the invention.

Example 2: Preparation of Components B with Caffeine as Organic Base

Different components B were prepared with the components listed in Table II:

TABLE II

| | | % by weight | | | |
|---|---|---|---|---|---|
| Component | Function | 2a | 2b | 2c | 2d |
| Triacetin | Plasticizer/Diluent | 92.25 | 92.60 | 94.22 | 94.57 |
| Hydrated calcium silicate (Promaxon ® D, Lapinus Fibers) | Heterogeneous initiator | 3.69 | 3.70 | 1.72 | 1.73 |
| Caffeine | Anionic initiator | 0.37 | — | 0.37 | — |
| Hydrophobized silica (Aerosil ® R 202, Evonik) | Thixotropic agent | 3.69 | 3.70 | 3.69 | 3.70 |

In a container the 90% by weight of triacetin is placed. In case of being present, caffeine was added to triacetin under stirring at room temperature for approximately 30 minutes until complete dissolution or dispersion.

The hydrated calcium silicate was dispersed in approximately the 10% by weight of triacetin to obtain a stock dispersion that was aged for approximately 48 hours, that after this time period was added to the major portion of triacetin, optionally containing caffeine.

Then, the hydrophobized silica was added at room temperature under mechanical stirring for approximately 30 minutes. Thorough blending was accomplished by using the mixer Speedmixer Model Thinky ARE-250 of the company Intertronics, Great Britain.

The resulting dispersion was transferred to a high-density stoppered polyethylene container and was kept closed until the moment of use.

Example 3: Preparation of a Component B with Indoline

A component B was prepared with the components listed in the Table III:

TABLE III

| Component | Function | % by weight |
|---|---|---|
| Triacetin | Plasticizer/Diluent | 92.2 |
| Hydrated calcium silicate (Promaxon ® D, Lapinus Fibers) | Heterogeneous initiator | 3.7 |
| Indoline | Anionic initiator | 0.4 |
| Hydrophobized silica (Aerosil ® R 202, Evonik) | Thixotropic agent | 3.7 |

This composition B was prepared following an analogous method to that of Example 2.

This composition B was tested in combination with the component A of Example 1.

Example 4 (Comparative): Preparation of Comparative Components B

Different comparative components B were prepared with the components listed in Table IV:

TABLE IV

| | | % by weight | | |
|---|---|---|---|---|
| Component | Function | 4a | 4b | 4c |
| Triacetin | Plasticizer/Diluent | 95.3 | 69.8 | 70.0 |
| Polyethylene in microparticles | Filler | — | 27 | 27.1 |
| Caffeine | Anionic initiator | 0.4 | 0.4 | — |
| Silicic anhydride (Aerosil ® R 202, Evonik) | Thixotropic agent | 4.3 | 2.8 | 2.9 |

These comparative components B were prepared following an analogous method to that of Example 2.

The most important characteristics of these components are:

Comparative Example 4a includes caffeine as organic base, but does not include hydrated calcium silicate.

Comparative Example 4b includes caffeine as organic base and polyethylene in form of microparticles (UH 1250, Inhance/Fluoro Seal).

Comparative Example 4c does not include organic base, but does include polyethylene in form of microparticles.

These comparative components B were tested in combination with the component A of Example 1.

Example 5 (Comparative): Preparation Comparative Components B

Different comparative components B were prepared with the components listed in Tables V and VI:

TABLE V

| | | % by weight | | |
|---|---|---|---|---|
| Component | Function | 5a | 5b | 5c |
| Triacetin | Plasticizer/Diluent | 87.4 | | 87.0 |
| Glass microparticles | Filler | | 87.0 | 8.7[2] |
| Caffeine | Anionic initiator | 0.4 | 8.7[1] | 0.4 |
| Hydrophobized silica (Aerosil ® R 202, Evonik) | Thixotropic agent | 3.7 | 3.9 | 3.9 |

TABLE VI

| | | % by weight | | |
|---|---|---|---|---|
| Component | Function | 5d | 5e | 5f |
| Triacetin | Plasticizer/Diluent | 87.4 | 87.0 | 87.4 |
| Glass microparticles | Filler | 8.7[2] | 8.7[3] | 8.7[3] |
| Caffeine | Anionic initiator | — | 0.4 | — |
| Hydrophobized silica (Aerosil ® R 202, Evonik) | Thixotropic agent | 3.9 | 3.9 | 3.9 |

[1]: Omicron® NPRPO (Sovitec, S. A., Belgium), untreated glass microparticles
[2]: Omicron® NP3P1 (Sovitec, S. A., Belgium), resin treated glass microparticles
[3]: Omicron® NP3P4 (Sovitec, S. A., Belgium), anti-sedimentation type glass microparticles These comparative components B were prepared following an analogous method to that of Example 2.

The most important characteristics of these components are the following:

Comparative Example 5a includes caffeine as organic base, and untreated glass microparticles as filler.

Comparative Example 5b includes untreated glass microparticles as filler, and does not include organic base.

Comparative Example 5c includes caffeine as organic base, and resin treated glass microparticles as filler.

Comparative Example 5d includes resin treated glass microparticles as filler, and does not include organic base.

Comparative Example 5e includes caffeine as organic base, and anti-sedimentation type glass microparticles as filler.

Comparative Example 5f includes anti-sedimentation type glass microparticles as filler, and does not include organic base.

These comparative components B were tested in combination with the component A of Example 1.

Example 6: Application Tests

The application tests of the compositions of the invention and of the comparative compositions were made by combining on each occasion the component A of Example 1, with the different components B of Examples 2 and 3 of the invention, and Examples 4 and 5 of the comparative components B.

In each example of application, component A and component B were packed independently in the two chambers of a double-plunger syringe available, for example, through Sulzer Mixpac, Switzerland. The component A was always placed in the chamber of higher volume. The proximal ends of the chambers were closed with respective appropriate pistons immediately after the filling, while the distal ends were capped with a removable stopper before proceeding to filling the chambers. The mixing of component A with component B is performed by removing the caps of the two chambers of the syringe and fitting a nozzle with static mixer elements at the distal end. This nozzle is designed specifically for each syringe, and is supplied as a kit which includes the syringe, the plungers, and the nozzle, through Sulzer Mixpac, Switzerland.

In the tests performed the mixing ratio by volume was of 4 parts of component A and 1 part of component B. The adhesive composition resulting from mixing components A and B was dispensed from the tip of the static mixer onto one part of the substrate to be bonded. The second part of the substrate was assembled atop the first bearing the adhesive composition with an overlap area of 250 mm$^2$. The two assembled parts were clamped with clips and kept at room temperature for 24 hours, unless otherwise stated. Tensile strength of the assembled parts was determined by destructive testing.

In Table VII the results obtained with the compositions prepared in Examples 1 to 3 of the invention, and comparative Examples 4 and 5 are presented. In the table are shown:

the working time (WT), expressed in minutes,
the usage time (UT), expressed in minutes,
the average tensile strength determined on a mild steel substrate after remaining 24 hours at room temperature, when the thickness of the gap of adhesive was 2 mm, expressed in MPa, and
the energy, expressed in Joules, obtained by the integration of the tensile strength versus time curve, during the time necessary for strength to drop to zero:

TABLE VII

| Example | WT (min) | UT (min) | Tensile strength CTV 2 mm (MPa) | Energy (J) |
|---|---|---|---|---|
| 2a | 4 | 3-4 | 8.80 | 5.57 |
| 2b | 4 | 3-4 | 10.38 | 4.00 |
| 2c | 6-7 | 4 | 11.84 | 5.6 |
| 2d | 6-7 | 4 | 10.27 | 3.4 |
| 3 | 3-4 | 2 | 11.47 | 4.02 |
| 4a Comparative | 60 | 25-30 | 11.95 | 3.93 |
| 4b Comparative | >90 | 90 | 12.68 | 1.54 |
| 4c Comparative | >90 | >90 | 4.02 | 1.03 |
| 5a Comparative | —* | —* | 14.50 | 5.24 |
| 5b Comparative | —* | —* | 12.23 | 4.00 |
| 5c Comparative | —* | —* | 13.76 | 4.69 |
| 5d Comparative | —* | —* | 11.60 | 3.94 |
| 5e Comparative | —* | —* | 10.35 | 6.15 |
| 5f Comparative | —* | —* | 12.77 | 5.04 |

*the measured times were not reliable because the additive sedimented almost immediately It can be observed that the adhesive compositions of the invention (Examples 2 and 3) have usage times (UT) comprised between 2 and 4 minutes, and working times comprised between 3 and 7 minutes, which are appropriate for the fast repair works.

No significant shrinkage was observed, even when they were cured with low filler content, as in the compositions of Examples 2 and 3. It should be noted that one part by volume of component B is combined with four parts by volume of component A.

The energy parameter is the amount of energy absorbed during the destructive test, and is representative of the toughness of the cured material towards traction.

It is observed that the absorbed energy is higher in the case of using caffeine as organic base combined with the hydrated calcium silicate, even when the content of the latter is low (Example 2a vs. 2b, and Example 2c vs. 2d).

The cured compositions corresponding to Example 2 were able to be treated with an abrasive, such as glass paper or metal file to obtain smooth surfaces.

The low density of the hydrated calcium silicate used in the compositions of the invention avoided its sedimentation in the suspension of component B, while the comparative compositions of Example 5 could not be used satisfactorily because of the sedimentation of the filler. The use of this component at low concentrations did not show any adverse effect on the viscosity of the formulation, but it counteracted the shrinkage after the curing process. The high values of the CTV obtained in Examples 2b and 2d revealed that the hydrated calcium silicate is itself an effective curing agent through gaps of 2 mm.

The invention claimed is:
1. A cyanoacrylate composition comprising:
1) a component A comprising a cyanoacrylate, wherein the content of cyanoacrylate is comprised of between 50% and 99% by weight based on the total weight of component A, and
2) a component B,
wherein the component B comprises a hydrated calcium silicate that has the chemical structure of xonotlite, the hydrated calcium silicate comprising particles that are substantially spherical and microporous.

2. The composition according to claim 1, wherein the cyanoacrylate is represented by the general formula (I):

wherein R is selected from the group consisting of $C_1$-$C_{16}$ linear or branched alkyl groups, $C_2$-$C_{16}$ alkoxyalkyl, $C_3$-$C_{16}$ cycloalkyl, $C_2$-$C_{16}$ alkenyl, $C_7$-$C_{16}$ aralkyl, $C_6$-$C_{16}$ aryl, $C_3$-$C_{16}$ allyl, and $C_1$-$C_{16}$ haloalkyl.

3. The composition according to claim 2, wherein R is ethyl, $C_2$-$C_{16}$ alkoxyalkyl, 2-ethylhexyl, or combinations thereof.

4. The composition according to claim 1, wherein component A comprises a stabilizing agent selected from the group consisting of radical stabilizing agents, acid stabilizing agents, and mixtures thereof.

5. The composition according to claim 4, wherein the radical stabilizing agent is selected from the group consisting of 4-methoxyphenol, hydroquinone, hydroquinone monomethyl ether, hydroxytoluene butyl ether, hydroxyanisole butyl ether, and mixtures thereof.

6. The composition according to claim 4, wherein the acid stabilizing agent is selected from the group consisting of methanesulfonic acid, p-toluenesulfonic acid, hydrofluoric acid, boron trifluoride, boron trifluoride etherate complex, sulfur dioxide, sulfur trioxide, tin (IV) chloride, iron (III) chloride, citric acid, and mixtures thereof.

7. The composition according to claim 1, wherein component A further comprises a thickener, and a thixotropic agent.

8. The composition according to claim 1, wherein component A comprises between 85% and 90% by weight of $C_1$-$C_{16}$ alkyl cyanoacrylate; between 5.5% and 7.5% by weight of a thickener; between 5% and 7.5% by weight of a thixotropic agent; between 0.1% and 0.3% by weight of an accelerator; between 0.1% and 0.3% by weight of an antioxidant; between 0.02% and 0.06% by weight of a radical stabilizing agent; between 0.0015% and 0.02% by weight of an acid stabilizing agent, based on the total weight of component A.

9. The composition according to claim 1, wherein the content of hydrated calcium silicate is comprised between 0.5% and 8% by weight, based on the total weight of component B.

10. The composition according to claim 1, wherein component B comprises a diluent.

11. The composition according to claim 10, wherein the diluent is triacetin.

12. The composition according to claim 1, wherein component B comprises an organic base defined by the general formula (II):

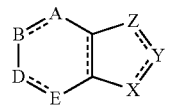

(II)

wherein:
X=NH, $CH_2$, $CH_2CH_2$, or N,
Y=NH, $CH_2$, $CH_2CH_2$, $CHCH_3$, methine (=CH), chloromethine (=CCl), or C=O,
Z=$CH_2$, CH—$CH_3$, $C(CH_3)_2$, $CHCO_2H$, methine (=CH), NH, $NCH_3$, or N
A=CH, C=O, $CCF_3$, COH, $CNO_2$, or C-halogen,
B=CH, $CCO_2H$, $CSO_3H$, NH, $NCH_3$, $NCH_2CH(OH)CH_2OH$, $NCH_2CH(OH)CH_2N(CH_3)CH_2CH_2OH$, $N(CH_2)_4COCH_3$, $CCF_3$, COH, CNO2, $CCO_2H$, or C-halogen,
D=CH, C=O, $CCF_3$, COH, $CNO_2$, $CCO_2H$, or C-halogen,
E=CH, NH, $NCH_3$, $NCH_2CH(CH_3)_2$, $CCF_3$, COH, $CNO_2$, $CCO_2H$, or C-halogen, and
wherein the dashed lines in the formula (II) indicate that any bond may be single or double.

13. The composition according to claim 1, wherein component B comprises between 92% and 98% by weight of diluent; between 1.5% and 4% by weight of hydrated calcium silicate that has the chemical structure of xonotlite, whose particles are substantially spherical and microporous, and between 0.2% and 0.6% of an organic base of formula (II), based on the total weight of component B.

14. A repair method for filling depressions, cracks or holes in a substrate or between substrates, the method comprising:
1) combining 4 parts by volume of the component A of the composition of claim 1, and 1 part by volume of the component B of the composition of claim 1,
2) applying this mixture into a depression, crack or hole of a first substrate or on an upper part of the first substrate, and optionally
3) assembling a second substrate atop the first substrate.

* * * * *